May 3, 1966 G. E. ROWE 3,249,200
APPARATUS FOR MOVING NEWLY FORMED GLASSWARE ONTO A CONVEYOR
Filed Sept. 9, 1964 3 Sheets-Sheet 2

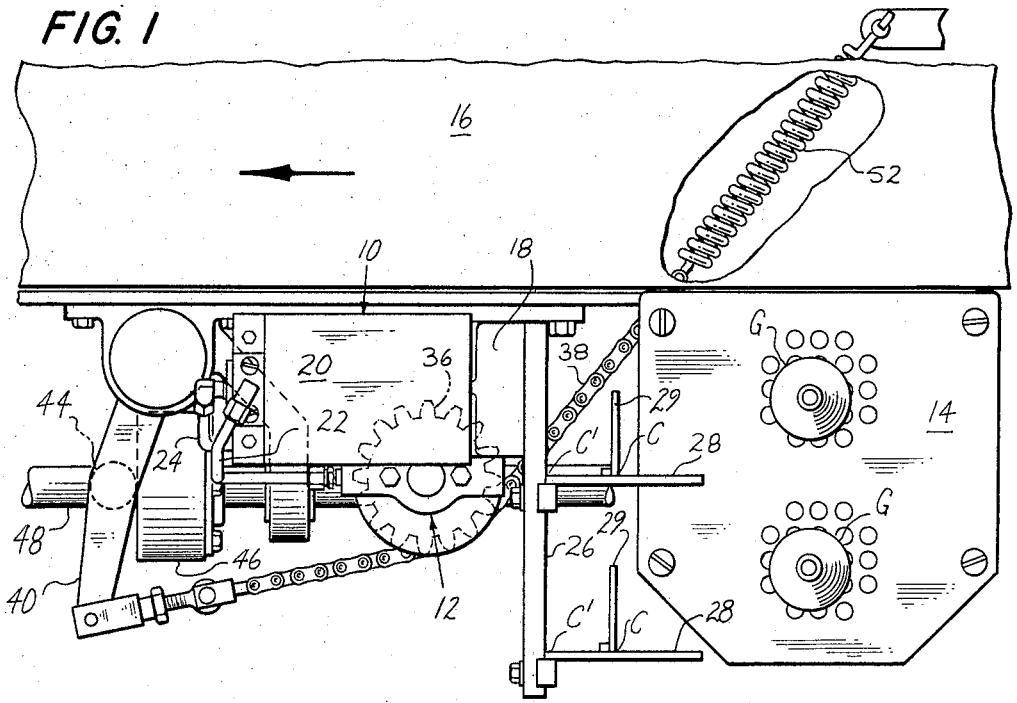

United States Patent Office 3,249,200
Patented May 3, 1966

3,249,200
APPARATUS FOR MOVING NEWLY FORMED
GLASSWARE ONTO A CONVEYOR
George E. Rowe, Wethersfield, Conn., assignor to Emhart
Corporation, Bloomfield, Conn., a corporation of
Connecticut
Filed Sept. 9, 1964, Ser. No. 395,177
6 Claims. (Cl. 198—24)

This invention relates to apparatus for handling glassware or the like, and more particularly to apparatus for moving newly formed glassware onto a conveyor for advance to a lehr or to storage or to some other equipment performing another operation on the ware.

It is the general object of the invention to provide an apparatus or mechanism capable of operating in timed relationship with a glassware forming machine, and which therefore, may be combined therewith to move one or more articles of newly formed ware from a platform onto a continuously moving conveyor in substantially aligned or otherwise predetermined order with every other glassware article similarly moved onto the conveyor.

Glassware forming machines, such as the well-known Hartford I.S. machine, often comprises a plurality of sections operated by a common drive means and in timed relationship with each other so that one or more articles of glassware are placed by each section on a platform or deadplate in timed sequence and in timed relationship with similar operations in the other machine sections. The one or more articles of glassware placed on the deadplate associated with each machine section are preliminarily cooled at the deadplate, and after this preliminary cooling, they are to be removed from the deadplate onto a continuously operating conveyor. Obviously, any mechanical means utilized to move the glassware articles from a deadplate onto a conveyor should be operated in timed relationship with other similar means associated with the other machine sections so that there will be a steady flow of glassware onto the conveyor in evenly spaced relationship in one or more lines and without any jamming.

In keeping with the present invention, an automatically operable apparatus is associated with the glassware forming machine section and is driven by the drive means common to all such sections to engage the article or articles of glassware on the deadplate and to then sweep the articles from the deadplate through an arcuate path onto the continuously moving adjacent conveyor at a peripheral speed substantially equal to the conveyor speed to avoid toppling. This apparatus includes a fluid motor having an extensible and retractable part, and the fluid motor is positioned on a base which oscillates through a substantial angle which, preferably, is approximately 90°. In one position the base and fluid motor face toward the deadplate, and in this position the fluid motor element is extended to engage the glassware. Then, the base and fluid motor are pivoted through the aforesaid substantial angle to face a longitudinal edge of the adjacent conveyor. In this position, the extensible part is retracted to release the articles of glassware to movement by the conveyor, and the base and fluid motor are then pivoted back to the initial or the said "one position."

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a top plan view of the apparatus provided in accordance with the present invention showing the fluid motor in a retracted position facing toward the deadplate;

FIG. 2 is a view similar to FIG. 1 but shows the fluid motor extended so as to engage the articles of glassware on the deadplate;

Figure 3:
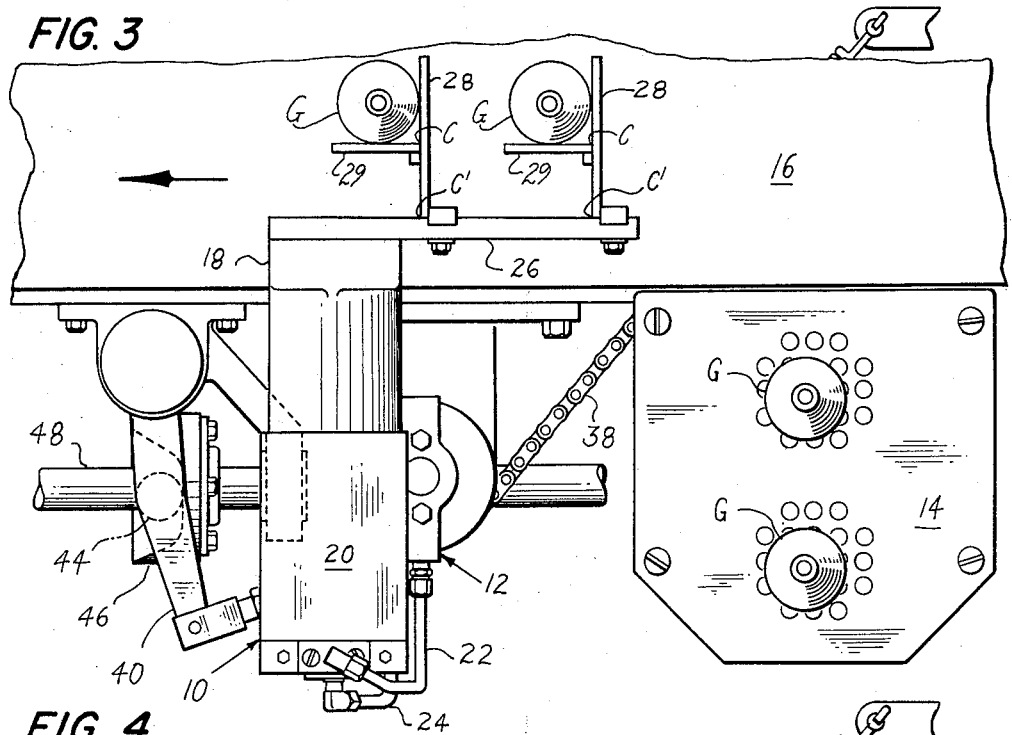
FIG. 3 is a view similar to FIGS. 1 and 2 but shows the fluid motor in the pivoted position wherein it faces the adjacent longitudinal edge of the conveyor and has just moved glassware onto the conveyor.

The previously mentioned fluid motor is designated generally by the reference numeral 10 in the various figures of the drawing, and the base or table which supports this fluid motor horizontally is designated generally by the reference numeral 12. As shown in FIGS. 1 and 2, the said motor and base can be positioned to face toward a stationary platform or deadplate 14, and they can be pivoted from this position toward the position shown in FIGS. 3, 4 and 5 wherein they face one longitudinal edge of a continuously operating conveyor 16 which moves in the direction of the arrow shown in all of the figures. Actually, the fluid motor 10 and its base 12 are oscillated between the aforesaid positions through a substantial angle which is approximately 90°, the longitudinal edge of the conveyor 16 being parallel to the fluid motor 10 in its first mentioned position and being adjacent an edge of the deadplate 14.

The fluid motor 10 is preferably pneumatic and is a reversible type. That is, it includes an extensible and retractable part 18, which in the example shown is the cylinder, and a stationary part 20, which in the example shown comprises a combination housing and piston. Air lines 22 and 24 are connected between the fluid motor 10 and its base 12 so that while one carries air under pressure and the other is connected to a vent and vice versa. By reversing the pressure and vent connections to the lines 22 and 24 as will be described, the part 18 is alternately extended and retracted.

Figure 4:
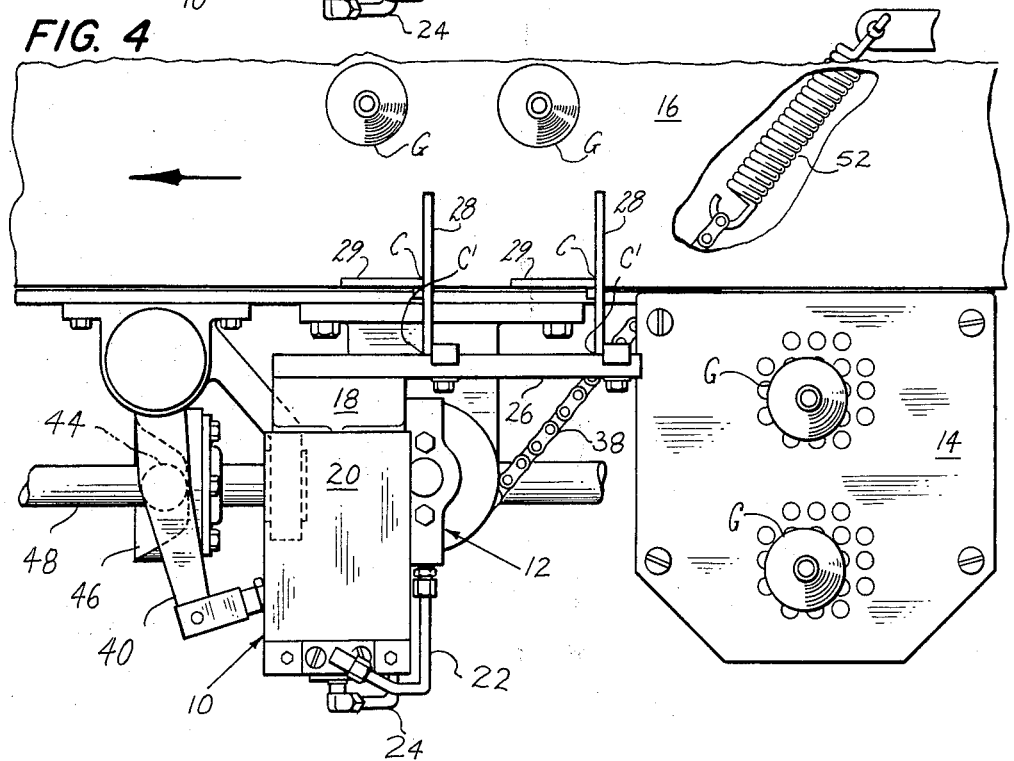
FIG. 4 is a view similar to FIG. 3, but shows the fluid motor retracted in the position wherein it faces the conveyor.
Figure 5:
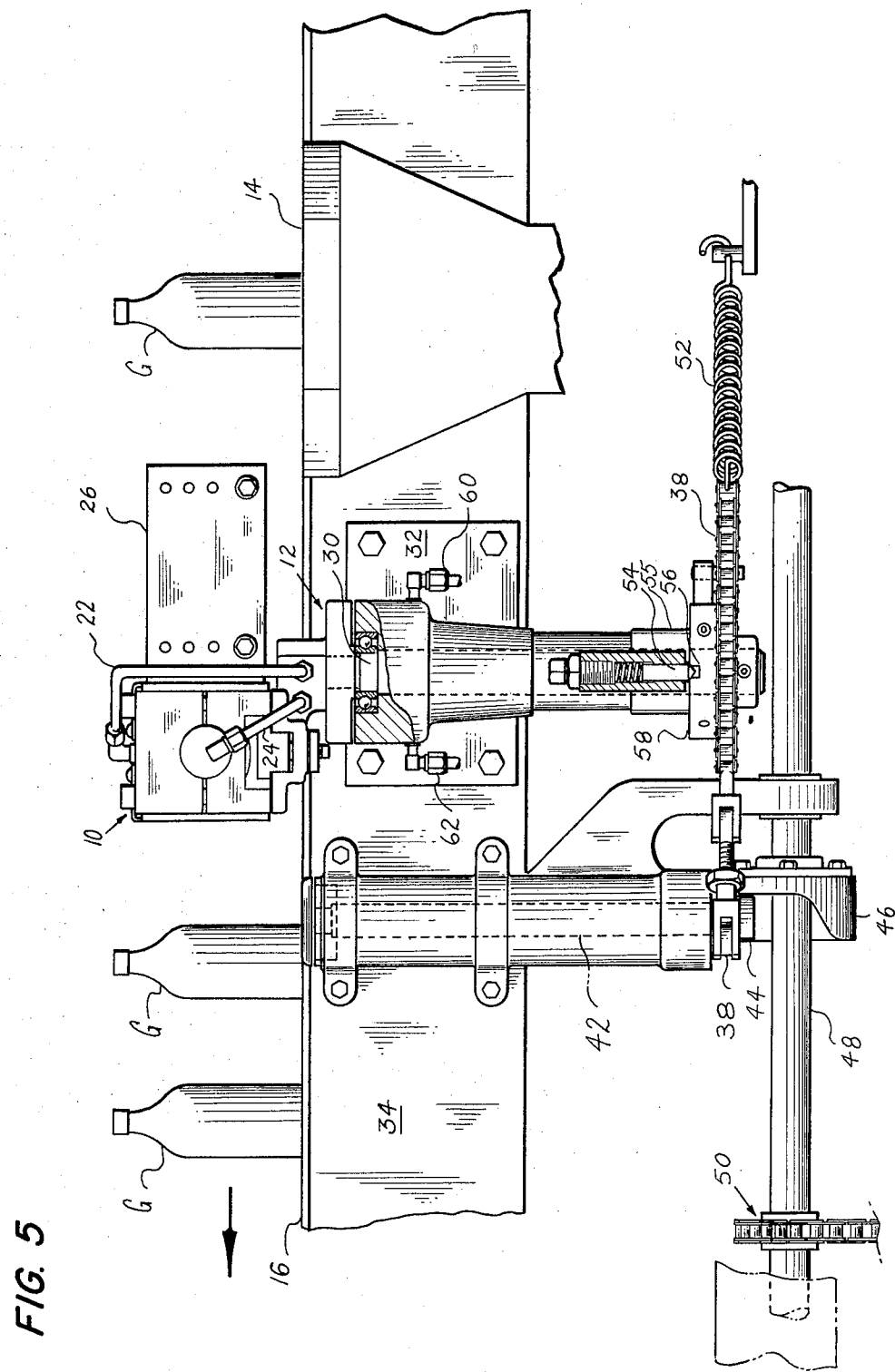
FIG. 5 is a rear elevational view of the apparatus with parts thereof shown in vertical section to reveal details of structure.

The reciprocable part 18 on the air motor 10 is provided with means which will engage one or more articles of glassware such as the bottles G, G on the deadplate 14 when the said part is extended to move said articles of glassware into the conveyor 16 by pivotal movement of the fluid motor 10 and base 12 from the position shown in FIGS. 1 and 2 to the position shown in FIGS. 3, 4 and 5. Then the part 18 is retracted after moving the articles onto the conveyor to the position shown in FIG. 4. The means for engaging and moving the articles of glassware includes a crossbar 26 secured to the end of the reciprocable cylinder 18. Preferably, the crossbar 26 is more in the form of a plate having a rather substantial vertical dimension. The means for engaging and moving the articles of glassware also includes a pair of tine plates. The tine plates 28, 28 are vertically adjustably secured to the crossplate 26 and they are provided with detachable projections 29, 29 which cooperate therewith to define corners C, C. It will be quite apparent that when the reciprocable part 18 is extended from the position shown in FIG. 1 to the position shown in FIG. 2, and when the said reciprocable part is then pivoted with the fluid motor part 20 the base 12 to the position shown in FIG. 3, it will sweep the articles of glassware G, G off the deadplate 14 and onto the conveyor 16 by sweeping said articles into the corners C, C. Then, as shown in FIG. 4, the part 18 can be retracted so that the tines 28, 28 will not be in position to interfere with the movement of other articles of glassware on the said conveyor. The articles of glassware G, G shown are relatively small. When the apparatus is used with quite large articles, the projections 29, 29 are removed and the articles are swept into and carried by the corners C', C' which are defined between the tines 28, 28 and the crossbar 26. Preferably, the projections 29, 29 are adjustably secured in positions along the tines to accommodate glassware of different size.

The means for pivoting or oscillating the fluid motor 10 and its base 12 between the aforesaid positions includes a vertical shaft 30 (FIG. 5) which is journalled in a bracket structure 32 secured to the frame 34 over which the conveyor 16 moves. The base 12 is secured to the upper end of the shaft 30 and a sprocket 36 (FIG. 1) is connected to its lower end wherein it is engaged by a chain 38.

As shown in the various views of the drawings, the left-hand end of the chain is pivotally connected to the extending end of a horizontal arm 40 which pivots about its other end on an axis coinciding with the centerline of a shaft 42 which extends vertically and which is suitably journalled on the frame 34. Between its ends the arm 40 supports a cam following roller 44 on a vertical axis, this follower being in engagement with the edge of a cam 46 which is secured for rotation with a horizontal driven shaft 48. The shaft 48 is driven by the glassware forming machine in a suitable manner, as for example, a sprocket and chain connection 50 being extended from the shaft 48 to the drive shaft (not shown) of the glassware forming machine.

The other end of the chain 38, the right-hand end thereof, is secured to a spring 52 which is anchored to a portion of the frame to apply a tension so as to maintain the cam follower 44 always in engagement with the caming surface of the cam 46. Thus, when the driven shaft 48 and cam 46 are in the rotated position shown in FIGS. 1 and 2, the chain 38 will be moved to the left as far as it will go, tensioning spring 52 and rotating the sprocket 36, the base 12 and the fluid motor 10 in a clockwise direction (as viewed from above) to the position wherein they face the deadplate 14. When the cam 46 and shaft 48 are in the rotated positions illustrated in FIGS. 3, 4 and 5, the spring 52 will have moved the chain 38 as far to the right as possible, pivoting the base 12 and fluid motor 10 counterclockwise to the position shown in FIGS. 3 and 4.

The sprocket 36 is indirectly connected to the lower end of the shaft. That is, it is rotatable on the shaft, but a spring loaded detent plunger 54 carried on a collar 55 which is pinned to the said shaft engages in a notch 56 in a hub 58 on the sprocket 36 to effect rotation of the shaft 30 with the sprocket. In the event of jamming, the detent plunger 54 will escape the notch 56 to avoid damage that might occur if connection between the shaft and sprocket were maintained.

In operation of the apparatus, the reciprocable motor part 18 is to be extended automatically whenever the fluid motor 10 faces toward the deadplate 14. After extension, the cam and cam follower mechanism will swing the fluid motor (counterclockwise as viewed in FIGS. 1–4) to the position wherein it faces the longitudinal edge of the conveyor 16. When the arc of the swing has been completed so that the fluid motor is in the position shown in FIG. 3, the part 18 is to be automatically retracted.

The cam slopes on the cam 46 are designed to provide a speed of arcuate movement which is coordinated with the linear speed of the conveyor. That is, the peripheral speed of the glassware through the arm is substantially matched to the speed of the conveyor so as to minimize the possibility of toppling the glassware articles.

The automatic extension and retraction of the fluid motor part 18 is obtained by introducing air under pressure selectively to one of the motor lines 22 and 24 while venting the other thereof. This is done through the base 12 and the shaft journal 32 which has a pair of fluid pressure lines 60 and 62 connected therewith. When the motor faces the deadplate, the motor line 24 is connected through the base 12 with one of the pressure lines, for example, the line 60, while the other motor line 22 is connected to a vent in the base. This extends the motor part 18. Then, when the motor faces the conveyor, the rotation of the base effects a connection between the motor line 22 and the pressure line 62 while connecting the motor line 24 to vent. This retracts the motor part 18.

Thus, the part 18 will be extended only when it faces the deadplate 14 and it will remain extended until it fully faces the conveyor 16. After a brief dwell caused by reversing pressure which permits the glassware to move ahead on the conveyor, the part 18 will be retracted and will remain retracted until the fluid motor again faces the deadplate. This rapid extension and retraction of the motor part 18 permits clearance on the deadplate for positioning the articles of glassware G, G thereon by the glassware forming machine while prior articles are being placed on the conveyor. It also permits the tine plates 28, 28 to be retracted from the position over the conveyor to avoid contact with other articles of glassware moving therealong.

The invention claimed is:

1. Apparatus for association with a glassware forming machine of a type adapted to place newly formed articles on a deadplate in timed sequence, the said apparatus being provided to move the articles from the deadplate onto a continuously moving adjacent conveyor and comprising a base oscillatable on a substantially vertical axis through a substantial angle between a first position facing said deadplate and a second position facing a longitudinal edge of said conveyor, drive means for oscillating said base between said first and second positions in timed relationship with the operation of said forming machine, reciprocating means mounted on said base including an element adapted to extend and retract and also including means for automatically extending said element when the base reaches said first position and for automatically retracting said element when the base reaches said second position, and article engaging means connected to said element and defining at least one corner into which a glassware article is swept and carried when said element is extended so that said articles are moved arcuately from a position over the deadplate to a position over the conveyor as the base is moved from its first to its second position, said article engaging means being movable inwardly to an inoperative position adjacent the base as said element is retracted.

2. Apparatus for association with a glassware forming machine of a type adapted to place newly formed articles on a horizontal deadplate in timed sequence, the said apparatus being provided to sweep the articles from the deadplate onto a continuously moving adjacent conveyor at substantially the speed of the conveyor and comprising a base oscillatable on a vertical axis through substantially a 90° angle between a first position facing the deadplate and a second position facing an edge of the conveyor, drive means for oscillating said base between said first and second positions in timed relationship with the operation of said forming machine, a reciprocable fluid motor mounted on said base including an extensible and retractable part and also including means for automatically extending said part when the base reaches said first position and for automatically retracting said part when the base reaches said second position, and article engaging means connected to said part and defining at least one corner into which a glassware article is swept and carried when said part is extended so that said articles are moved arcuately from a position over the deadplate to a position over the conveyor as the base is moved from its first to its second position, said article engaging means being movable inwardly to an inoperative position adjacent the base as said part is retracted.

3. Apparatus for association with a glassware forming machine of a type adapted to place newly formed articles on a deadplate in timed sequence, the said apparatus being provided to move the articles from the deadplate onto a continuously moving adjacent conveyor at substantially the speed of the conveyor and comprising a base oscillatable on a substantially vertical axis through a substantial angle between a first position facing said deadplate and second position facing a longitudinal edge of said conveyor, drive means for oscillating said base between said first and second positions in timed relationship with the operation of said forming machine, reciprocating motor means mounted on said base including an element adapted to extend and retract and also including means for automatically extending said element when the base reaches said first position and for automatically retracting said element when the base reaches said second position, crossbar means carried by said element, and a plurality of spaced apart forwardly projecting tines, each of which defines a corner with said crossbar means, whereby the apparatus is capable of simultaneously moving a plurality of articles from the deadplate into spaced apart positions on the conveyor.

4. Apparatus for association with a glassware forming machine as set forth in claim 3, wherein said drive means comprises a shaft driven in timed relationship with said forming machine, a cam on said shaft, a cam follower, a chain connected to said cam follower and biased to maintain follower and cam engagement, and a sprocket engaging said chain and connected with said base to oscillate the same responsive to cam follower movement.

5. Apparatus for association with a glassware forming machine of a type adapted to place newly formed articles on a horizontal deadplate in timed sequence, the said apparatus being provided to sweep the articles from the deadplate onto a continuously moving adjacent conveyor at substantially the speed of the conveyor and comprising a base oscillatable on a vertical axis through substantially a 90° angle between a first position facing the deadplate and a second position facing an edge of the conveyor, drive means for oscillating said base between said first and second positions in timed relationship with the operation of said forming machine, a reciprocable fluid motor mounted on said base including an extensible and retractable part and also including means for automatically extending said part when the base reaches said first position and for automatically retracting said part when the base reaches said second position, crossbar means carried by said element, and a plurality of spaced apart forwardly projecting tines, each of which defines a corner with said crossbar means, whereby the apparatus is capable of simultaneously moving a plurality of articles from the deadplate into spaced apart positions on the conveyor.

6. Apparatus for association with a glassware forming machine as set forth in claim 5, wherein said drive means comprises a shaft driven in timed relationship with the forming machine, a cam on said shaft, a cam follower, a chain connected to said follower and biased to maintain follower and cam engagement, and a sprocket engaging said chain and connected to said base to oscillate the same responsive to follower movement.

References Cited by the Examiner

UNITED STATES PATENTS

| | | | |
|---|---|---|---|
| 2,355,036 | 8/1944 | Berthold | 198—24 |
| 2,586,865 | 2/1952 | Roselle | 198—24 |
| 2,660,831 | 12/1953 | Rowe | 65—260 |
| 2,988,237 | 6/1961 | Devol | 214—11 |

MARVIN A. CHAMPION, *Primary Examiner.*